Sept. 27, 1927. 1,643,899
B. V. NORDBERG
COMBINED INLET AND UNLOADING VALVE GEAR
Filed May 21, 1925 3 Sheets-Sheet 1
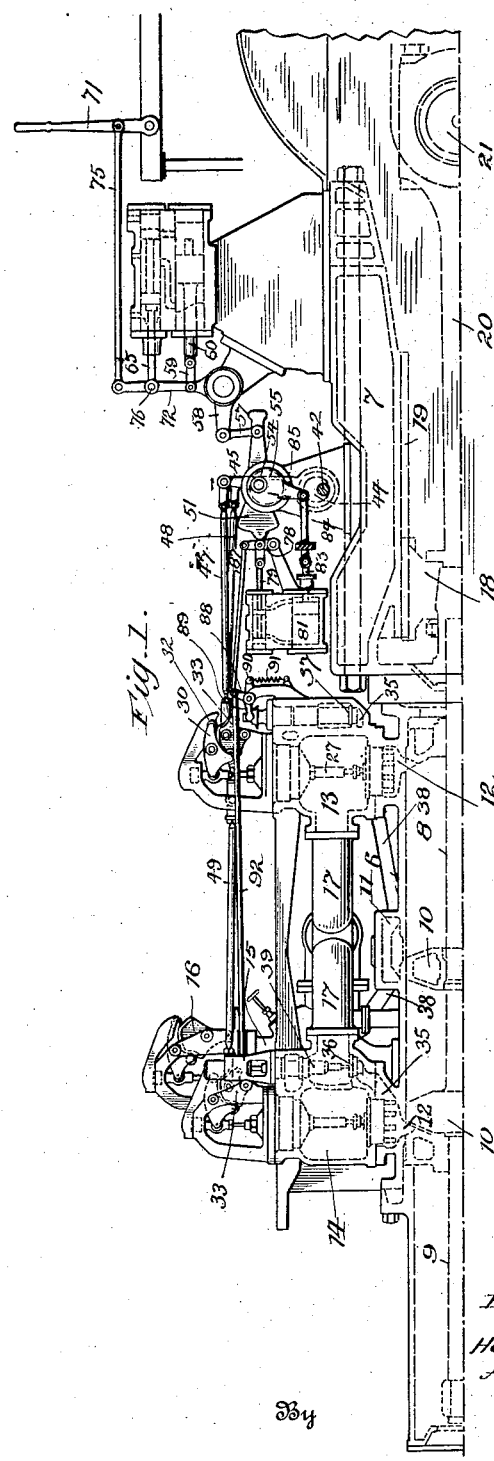
Inventor
Bruno V. Nordberg,
Deceased
Helena C. Nordberg,
Administratrix,
By
Attorneys

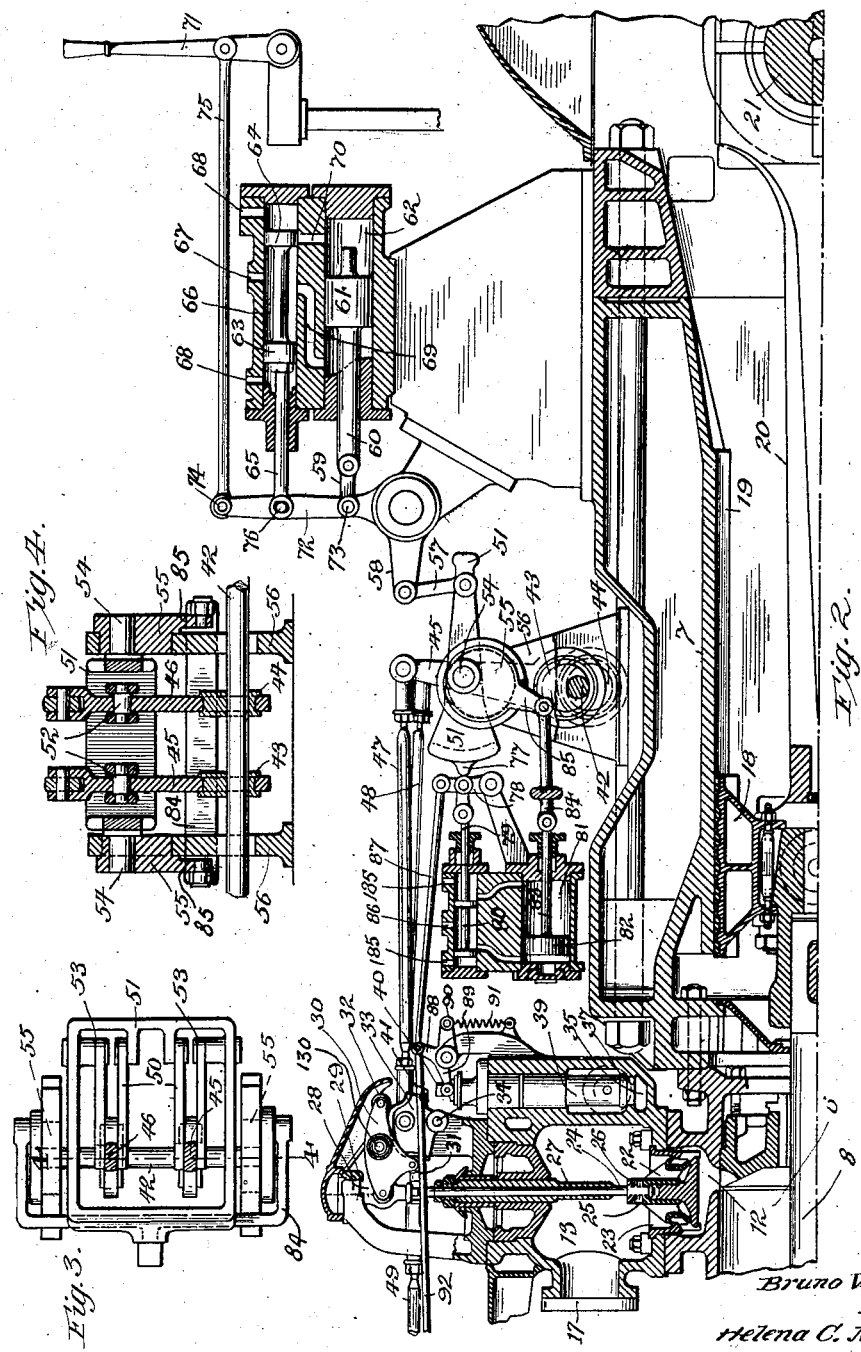

Sept. 27, 1927.  
B. V. NORDBERG  
1,643,899  
COMBINED INLET AND UNLOADING VALVE GEAR  
Filed May 21, 1925  
3 Sheets-Sheet 3
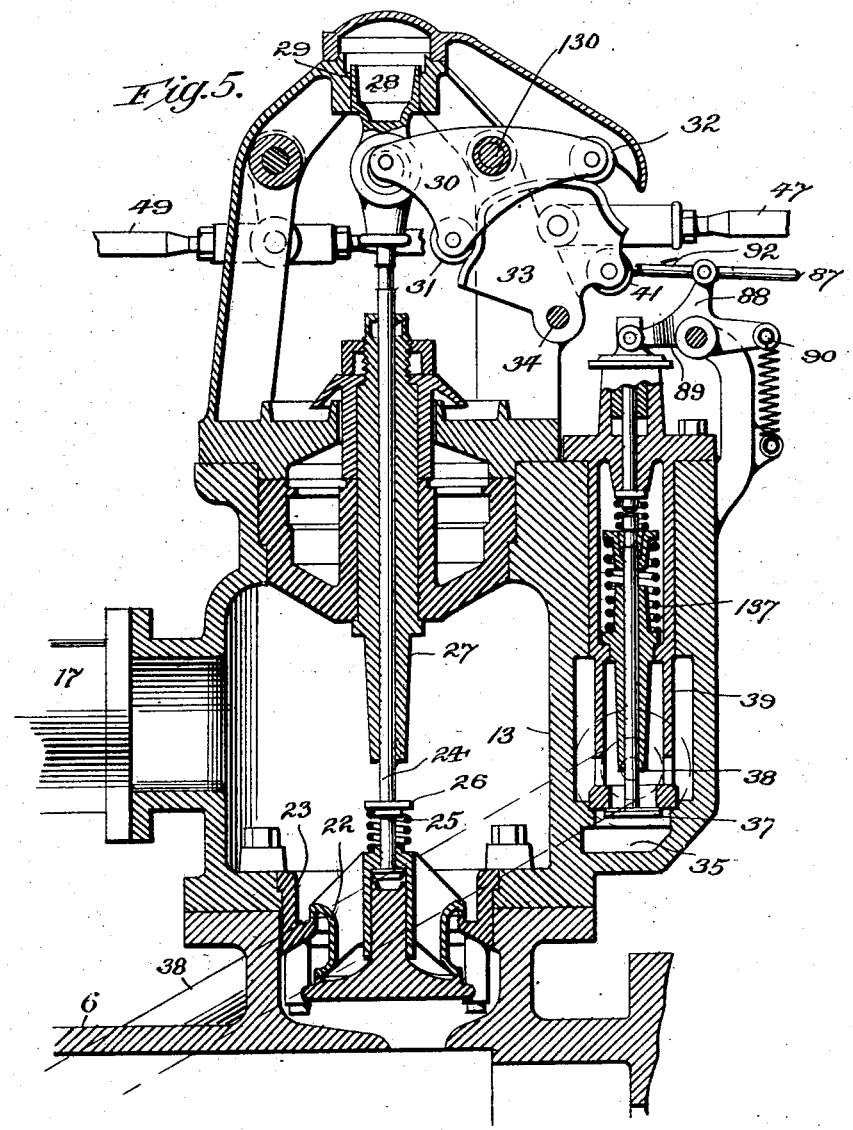
Inventor  
Bruno V. Nordberg  
Deceased  
Helena C. Nordberg  
Administratrix
By
Attorneys.

Patented Sept. 27, 1927.

1,643,899

UNITED STATES PATENT OFFICE.

BRUNO V. NORDBERG, DECEASED, LATE OF MILWAUKEE, WISCONSIN, BY HELENA C. NORDBERG, EXECUTRIX, OF MILWAUKEE, WISCONSIN.

COMBINED INLET AND UNLOADING VALVE GEAR.

Application filed May 21, 1925. Serial No. 31,957.

This invention relates to a maneuvering valve gear for steam engines and particularly to a reversing valve gear combined with an unloading mechanism so designed as to permit the engine to be started, stopped, and reversed solely by manipulation of the valve gear without the necessary intervention of any throttling action on the inlet steam and without any danger of the engine continuing its motion for a part of a rotation under light load because of steam trapped in the cylinders.

The invention is particularly intended for use on multi-cylinder reversing rolling mill engines of the type described and claimed in related application Ser. No. 31,954 filed May 21, 1925, and is a modification of and an improvement on the structure described in another related application for patent on reversing valve gear, Ser. No. 31,956 filed May 21, 1925. In the drawings the invention is shown as applied to one cylinder unit of a multi-cylinder rolling mill engine. The valve gear is available for use in other connections and no necessary limitation to this field of use is implied. The utility of the invention and the importance of certain characteristics can best be explained in connection with reversing rolling mill engines, and it is for this reason that it is so described.

The past practice in driving reversing rolling mills with steam engines was to use two cylinders set quartering and operating on long cut-offs, usually about 90%. The long cut-off was necessary to get high starting torque in unfavorable crank positions, and was desirable for smooth action because the necessity for quick reversal precluded the use of fly wheels, and even required reduction of the rotating masses to a minimum. Rolling mill engines are subjected to extreme and sudden variations of load, and in order to secure smooth action it was necessary to throttle the inlet steam, so that the throttling checked sudden accelerations of the engine while permitting the engine to meet load increases.

The combined effect of throttled inlet and long cut-off is necessarily low efficiency, and the purpose of the invention covered by the related application first referred to is to produce a reversible rolling mill engine in which no throttling regulation is required, in which the steam is used expansively at varying cut-off according to the load, and in which the engine is started, stopped, and reversed solely through manipulation of the reversing valve gear. To do this successfully three or more double-acting cylinders are necessary. The engine of that application included an unloading valve mechanism which was actuated by the inlet valve mechanism when the latter had its maximum travel, characteristic of full gear settings.

The second of the applications above identified describes and claims a reversing valve gear having a constant lead characteristic throughout the range of its forward and reverse settings, and provided with means to neutralize this lead at, and only at, mid-gear position, so that in this position all the inlet valves are closed to bring the engine to rest. The present application relates to a valve gear of this general description, and resides in the provision of means for unloading all cylinders when the valve gear is moved to mid gear position. In some cases this is desirable because if the valve gear be set to stop the engine when the latter is running under light load, steam trapped in the cylinders is likely to continue the movement of the engine beyond the desired stopping point. This result is prevented by the instant venting, or unloading, of all the cylinder working spaces when the valve gear is moved to mid gear position.

The invention is illustrated applied to an engine of the terminal exhaust or uniflow type for the reason that this permits the elimination of all exhaust valve gear and reversing mechanism therefor, and further because it permits a reduction of the clearance in the working spaces.

The present application also illustrates how the unloading mechanism characteristic of the present invention may be combined with unloading mechanisms characteristic of the prior application, so that neither unloading mechanism interferes with the action of the other. It follows that all cylinders are unloaded or vented in mid gear position, and that there is a secondary unloading of certain of the cylinders in both full gear positions. These two unloading actions can be, and preferably are, performed by the same valve actuated by two independent and non-interfering means.

Invention also resides in the particular arrangement of mechanism for shifting the quadrant yoke to neutralize the lead. Specific claims to this construction are included in the present application. Broader claims are presented in the second of the prior applications above identified. General claims to the mechanism for unloading in full gear position, and other features referred to as covered by the prior applications identified above are not claimed herein, but are reserved for said applications.

The preferred embodiment of the invention is illustrated in the accompanying drawings, in which—

Fig. 1 is a partial side elevation of one cylinder unit complete, together with the servo-motor mechanism by which the valve gear is maneuvered;

Fig. 2 is an enlarged fragmentary longitudinal section, somewhat diagrammatic in character, showing the valve gear, the maneuvering mechanism therefor, and the connections from the valve gear to the inlet valves;

Fig. 3 is a fragmentary plan view showing the shiftable support for the quadrant yokes and the arrangement of these yokes and of the eccentric rods;

Fig. 4 is a vertical section on the line 4—4 of Fig. 3.

Fig. 5 is an enlarged sectional view of the crank end inlet valve and unloading valve.

The cylinder is shown at 6 and a portion of the main frame at 7. The piston rod is illustrated at 8 and the tail rod at 9. The piston, which is of the elongated type characteristic of terminal exhaust engines, consists of two heads 10, 10 spaced apart on the rod 8, this being a familiar construction in engines of this type. The exhaust belt is shown at 11, the inlet steam ports at 12, the crank end steam chest at 13 and the head end steam chest at 14. The main throttle valve, whose form is not material to the present invention, is shown at 15 and a cam mechanism for actuating this throttle valve at 16. The inlet steam connections are shown at 17. The cross head is shown at 18, guides at 19, connecting rod at 20 and crank pin at 21. The crank shaft is not illustrated, but is of ordinary construction.

The construction of the steam inlet valves is best shown in Fig. 5. The inlet valve consists of a double-beat poppet valve 22 which seats in the usual cage 23 and which is actuated by a stem 24 through a resilient connection consisting of a compression spring 25 held between a collar 26 on the stem 24 and the upper end of the poppet valve 22. The purpose of this construction is to secure a slightly yielding seating pressure on the valve 22 when the latter is closed. The stem 24 reciprocates in a guide sleeve 27 and carries at its upper end a head 28 which slides in a guideway 29. The head 28 is linked to and actuated by a cam follower 30 fulcrumed at 130 which has two rollers 31 and 32 which coact with an actuating cam 33 in such a way that as the cam 33 is oscillated about its pivot 34, the head 28 is positively reciprocated in a vertical direction. The parts are so arranged that as the cam 33 oscillates, the follower 30 is positively actuated to impart sudden upward and downward movements to the head 28 and so that the cam 33 may have slight over-travel while maintaining the inlet valve either open or closed, according to the direction of the over-travel.

A branch port 35 (see head end valve, Fig. 1) leads from inlet port 12 to the space below two auxiliary valves which are closely related to each inlet valve, there being two of these auxiliary valves for each inlet valve. The first auxiliary valve is shown in dotted lines at 36 on the head end inlet valve in Fig. 1. It controls a passage from the branch port 35 to the inlet steam passage 17 and consists of a single beat poppet valve opening toward the steam chest 13 and held seated by inlet steam pressure. It is merely a safety device to vent steam from the cylinder to the inlet steam connection if cylinder pressure should exceed inlet steam pressure, as it might do in the event of accident or maladjustment of the inlet valve or of the unloading mechanism. It is therefore a relief valve and will be referred to hereinafter by this name.

The second auxiliary valve is shown at 37 in dotted lines in connection with the crank end inlet valve on Fig. 1, and is shown more in detail in Figs. 2 and 5. It is a poppet valve controlling the communication from the port 35 to a branch port 38 which leads to the exhaust belt 11 (see Fig. 1). The valve 37 is a single beat poppet valve which opens toward the port 35 and hence normally is held closed by cylinder pressure and also by a spring 137 (see Fig. 5) enclosed in the sleeve or bonnet 39 which supports and guides the valve 37 (see Fig. 2). The valve 37 is actuated by a head 40 which engages the upper end of its stem, and this head 40 is located below a roller tappet 41 on the inlet valve actuating cam 33. The parts are so arranged and proportioned that when the cam 33 has its maximum range of movement, which occurs in both full gear positions, the valve 37 will be opened at a time when the inlet valve 22 is closed. It follows from this construction that when the valve gear is set in full gear position for either forward or reverse rotation, the unloading valve 37 will be opened if the corresponding inlet valve 22 be closed. The effect of this is that when the engine is stopped by the movement of the valve gear to mid gear position, such steam as is trapped in any working space will be vented to the exhaust automatically through the unloading valve by the movement of the valve gear to either full gear position. Such shifting occurs as an incident to starting the engine in either direction.

It is not feasible in an engine of large size to mount the valve-actuating eccentrics on the crank shaft. Consequently a lay shaft 42 is provided to carry the eccentrics. The lay shaft 42 is parallel with the crank shaft and is driven in the same direction and at equal speed with the crank shaft by any suitable drive mechanism, this detail being omitted from the drawings.

The lay shaft 42 carries for each cylinder of the engine two eccentrics 43 and 44 spaced 180° from each other, the eccentric 43 being used to actuate the crank end inlet valve, and the eccentric 44 being used to actuate the head end inlet valve. The eccentric 43 is provided with a strap or eccentric rod 45 and the eccentric 44 with a strap or eccentric rod 46. The eccentric rod 45 is connected by a reach rod 47 with the cam 33 which actuates the crank end inlet valve. The eccentric rod 46 is connected by two inter-connected reach rods 48, 49 with the cam 33 which actuates the head end inlet valve.

The eccentric rods 45 and 46 are guided by radius bars 50 (see particularly Fig. 3) supported on a quadrant yoke 51, the radius bars 50 being pivoted both to the eccentric rods 45 and 46 at 52, and to the quadrant yoke 51 at 53. The quadrant yoke 51 itself is pivoted on the trunnions 54. The distance on centers between the trunnions 54 and the pivots 53 is equal to the distance on centers between the pivots 53 and the pins 52. The valve gear is set to produce variable cut-off in both forward and reverse running by swinging the quadrant yoke 51 on the trunnions 54.

The valve gear so far described is merely a conventional Marshall reversing gear having a constant lead characteristic. In order to modify the action of the gear to neutralize the lead and close the inlet valves in mid gear position, I describe in the second of my related applications above identified means for shifting the quadrant yoke 51 bodily. This idea is consequently not claimed broadly in the present application. The present application does, however, show a particular mechanism for bringing about this result not described or claimed in the prior application and claimed herein.

The trunnions 54 are mounted eccentrically in circular supporting members 55 swiveled in brackets 56. The brackets 56 are sustained by the frame 7, and the eccentric arrangement of the trunnions 54 is such that when the discs 55 are rotated through a small angle, the trunnions 54 are displaced a short distance horizontally. This result is effected by a hydraulic servo-motor controlled by the position of the quadrant yoke 51 and this, in turn, is determined by means of another servo-motor controlled through a hand-operated maneuvering lever.

The quadrant yoke 51 is connected by means of a link 57, bell crank 58 and link 59 with the piston rod 60 connected with the piston head 61. The piston head 61 works in a cylinder 62, and because of the arrangement of the rod 60, serves as a differential piston, so that it moves to the left when both sides are subjected to equal pressure, and to the right when the right side is connected to exhaust and the left side to the source of pressure.

The action of the piston 61 is controlled by a piston valve consisting of two heads 63 and 64 fixed on a stem 65 and working in a valve chamber 66. Pressure is supplied through the port 67, while the ports 68 are exhaust ports. A port 69 communicating with the space between the heads 63 and 64 constantly connects the supply port 67 with the space to the left of piston head 61. The piston head 64, which is provided with substantial lap, alternately, according to its position, connects the supply port 67 with a port 70 leading to the space to the right of piston 61, or connects this port 70 with the exhaust port 68 to discharge pressure fluid from the space to the right of the piston 61.

The valve stem 65 is actuated conjointly by a maneuvering lever 71 and by the piston rod 60. This is effected through a floating lever 72 which is pinned at 73 to the bell crank 58 and at 74 to a link 75 connected with the maneuvering lever 71. This floating link 72 has a pin-and-slot connection 76 with the valve stem 65. This will be recognized as a familiar servo-motor linkage through which the quadrant yoke 51 may be made to assume definite positions corresponding to definite positions of the maneuvering lever 71.

In the present application the shifting of the quadrant to neutralize the lead is caused by the motion of the quadrant to mid gear position. This result is secured by providing a cam nose 77 on the quadrant 51 in position to actuate a lever 78. The lever 78 is linked to the stem 79 of a piston valve 80 which controls the admission and exhaust of pressure fluid to and from the ends of a double-acting cylinder 81 whose piston 82 is connected by a rod 83 and forked yoke 84 with arms 85 formed integrally with the swiveled members 55. The parts are so arranged that when the cam 77 acts on the lever 78, the piston 82 is moved to the left. Since the trunnions 54 are above the centers of the swiveled members 55, these trunnions are shifted to the right, swinging the inlet valve cams 33 slightly to the right a distance sufficient to take off the lead and close any open inlet valves. The piston 82 is operated by hydraulic pressure which is admitted through the ports 185 and exhausted through the ports 86, the action being obvious from the drawing.

In order to unload the cylinders in mid gear position, the lever 78 is connected by means of a reach rod 87 with the arm 88 of a three-armed bell crank. The second arm 89 of this bell crank is forked and straddles and enters into thrust relation with a portion of the head 40 which actuates the stem of the unloading valve 37. The arrangement is such that either the arm 89 or the roller 41 on cam 33 may force the head 40 downward to open the valve 37. The third arm 90 of the bell crank provides a connection for a coil spring 91 which tends to restore the parts to normal position, and also serves to hold the lever 78 in contact with the cam nose 77. A reach rod 92 connects the arm 88 of the bell crank on the crank end inlet valve with a similar arm 88 of the companion bell crank on the head end inlet valve. It follows from the construction that the unloading valves at both ends of the cylinder are opened simultaneously when the valve gear is set to mid gear position. When the valve gear is set in either full gear position the unloading valves are opened individually in alternation, each when the corresponding inlet valve is closed.

Assuming that the engine is at rest and that the valve gear is in the mid gear or neutral position, as shown in Fig. 2, all inlet valves are closed, all unloading valves are open. To start the engine the maneuvering lever is moved a distance sufficient to shift the quadrant 51 until cam 77 releases lever 78, allowing it to swing to the right. This sets the valve gear to run in one or the other direction at a short cut-off, and simultaneously rotates the blocks 55 in such manner as to restore the normal lead to the inlet valve. The engine having been unloaded when at rest, it will start under this short cut-off unless the load is too great, and the engineer may move the maneuvering lever 71 until a long enough cut-off is reached to bring sufficient cylinders into action to start the load. It is not necessary, as in the structures of my two other applications above identified, to move the maneuvering lever first to a full gear position in order to unload the engine, though if this be done, the resulting extreme displacement of the cams 33 will cause the rollers 41 to open the proper unloading valves 37.

Consequently, the invention provides two unloading means, each operating independently of the other under different conditions, the important one and the novel one, so far as this case is concerned, being the one which operates in neutral or mid gear position. Such an arrangement has particular utility in engines subject to sudden decreases of load, such as rolling mill engines, because if it be attempted to stop the engine just at the end of a pass, and the load suddenly falls after the gear has been set in neutral position, but while steam remains trapped in the cylinder working spaces, the engine may be kept in motion for nearly a full stroke.

When the engine is once in motion, the engineer may shift the lever 71 to vary the point of cut-off. In order to stop the engine and unload its cylinders he has but to return the lever 71 to mid-gear or neutral position.

The invention is obviously capable of embodiment in various different forms and I therefore do not limit myself except to the extent specified in the claims. The drawings are largely diagrammatic in character and a number of details, such as piston rings, packing glands, and other details essential to a commercial machine and well-understood by those skilled in the art, have been omitted to simplify the drawings.

What is claimed is:

1. The combination of a cylinder having steam inlet valves; a reversing valve gear connected to actuate said valves with variable cut-off in forward and reverse running and having a mid-gear position in which all the inlet valves are maintained closed; unloading valves for the working spaces of said cylinder; and means serving automatically to open said unloading valves when said valve gear is in mid-gear position.

2. The combination of a cylinder having steam inlet valves; a reversing valve gear of the Marshall type connected to actuate said valves and having a quadrant member which may be shifted to provide variable cut-off in forward and reverse running, and which has a mid-gear position in which said inlet valves are maintained closed; unloading valves; and actuating means for said unloading valves operable by said quadrant member as the latter moves to its mid-gear position.

3. The combination of a cylinder having steam inlet valves; a reversing variable cut-off valve gear of the Marshall type, having a constant-lead characteristic, connected to actuate said valves; unloading valves for the working spaces of said cylinder; and a mechanism rendered operative by the setting of said valve gear in mid-gear position, and when operative serving to shift said valve gear in inlet-valve closing direction and to open said unloading valves.

4. The combination of a cylinder having an inlet valve for each working space; a reversing valve gear connected to actuate the same with variable cut-off in forward and reverse running and having a mid-gear position in which all inlet valves are closed; an unloading valve for each working space of said cylinder; a motor for actuating such unloading valves; and automatic means for actuating said motor in unloading-valve opening direction as said valve gear is set in mid-gear position.

5. The combination of a cylinder having steam inlet valves; a reversing variable cut-off valve gear connected to actuate said valves with lead in all settings, including a guide member adjustable to determine the action of the valve gear and capable of being bodily shifted to close said valves; unloading valves for the working spaces of said cylinder; and means for simultaneously shifting said guide member bodily and opening said unloading valves.

6. The combination of a cylinder having steam inlet valves; a reversing variable cut-off valve gear connected to actuate said valves with lead in all settings, including a guide member adjustable to determine the action of said valve gear and capable of being bodily shifted to close said valves; unloading valves for the working spaces of said cylinder; a servo-motor controlling the setting of said guide member; and a second servo-motor connected to operate in time relation with the first servo-motor and when operated serving to open said unloading valves and shift said guide.

7. The combination of a cylinder having steam inlet valves; a reversing variable cut-off valve gear connected to actuate said valves with lead in all settings, including a guide member adjustable to determine the action of said valve gear and capable of being bodily shifted to close said valves; unloading valves for the working spaces of said cylinder; a servo-motor controlling the setting of said guide member; and a second servo-motor controlled by the movement of said guide member to and from mid-gear position, and when actuated serving to open said unloading valves and shift said guide.

8. The combination of a cylinder having steam inlet valves; a reversing variable cut-off valve gear connected to actuate said valves with lead in all settings and including a guide member adjustable to determine the action of the valve gear; means for bodily displacing said guide member in valve closing direction; and controlling means for said displacing means operated by the guide when set in mid-gear position.

In testimony whereof I have signed my name to this specification.

HELENA C. NORDBERG,
*Executrix of the Estate of Bruno V. Nordberg.*